(12) United States Patent
Liu

(10) Patent No.: US 11,738,788 B2
(45) Date of Patent: Aug. 29, 2023

(54) LUGGAGE CART

(71) Applicant: Li Liu, Zhalantun (CN)

(72) Inventor: Li Liu, Zhalantun (CN)

( * ) Notice: Subject to any disclaimer, the term of this patent is extended or adjusted under 35 U.S.C. 154(b) by 682 days.

(21) Appl. No.: 16/936,675

(22) Filed: Jul. 23, 2020

(65) Prior Publication Data
US 2021/0284214 A1 Sep. 16, 2021

(30) Foreign Application Priority Data
Mar. 12, 2020 (CN) .......................... 202020302127.X

(51) Int. Cl.
*B62B 1/14* (2006.01)
*B62B 1/12* (2006.01)
*B62B 1/26* (2006.01)

(52) U.S. Cl.
CPC ............... *B62B 1/14* (2013.01); *B62B 1/12* (2013.01); *B62B 1/26* (2013.01); *B62B 2202/24* (2013.01); *B62B 2203/00* (2013.01)

(58) Field of Classification Search
CPC .... B62B 1/14; B62B 1/12; B62B 1/26; B62B 2202/24; B62B 2203/00; B62B 1/125; B62B 5/067
See application file for complete search history.

(56) References Cited

U.S. PATENT DOCUMENTS

| 4,865,346 A * | 9/1989 | Carlile ...................... B62B 1/12 280/654 |
| 5,549,318 A * | 8/1996 | Ho .......................... B62B 1/125 280/654 |
| 5,951,037 A * | 9/1999 | Hsieh ...................... B62B 1/125 280/655 |

FOREIGN PATENT DOCUMENTS

EP   1445164 A2 *   8/2004   ............... B62B 1/12

* cited by examiner

*Primary Examiner* — Kimberly T Wood

(57) ABSTRACT

A luggage cart includes a supporting tray and a latching mechanism. The latching mechanism includes a top seat, a fastening member, an actuating member, a bottom seat fixed to the supporting tray, and a latch bolt. The fastening member has a flange cap portion adapted for securing to a luggage container, and a shaft portion formed with a first locking part. The latch bolt is mounted to the bottom seat and is slidingly engaged with the actuating member. The actuating member is movable to move the latch bolt from a locking position, where the latch bolt engages the first locking part of the fastening member, to an unlocked position, where the latch bolt is disengaged from the first locking part to permit removal of the fastening member.

8 Claims, 14 Drawing Sheets

LUGGAGE CART

CROSS-REFERENCE TO RELATED APPLICATIONS

This application claims priority of Chinese Patent Application No. 202020302127.X, filed on Mar. 12, 2020.

FIELD

The disclosure relates to a hand cart, more particularly to a luggage cart.

BACKGROUND

Referring to FIGS. 1 to 3, Chinese Utility Model Patent No. CN204124159U discloses a conventional "luggage cart" that includes a supporting tray 11, two wheels 12 (only one is visible) disposed on the rear side of the supporting tray 11, a handle 13 pivotally mounted to the supporting tray 11, a holding plate 14 pivotally mounted on the supporting tray 11, a latch device 15 provided between the supporting tray 11 and the holding plate 14, and an axle 16 connected to the supporting tray 11, the wheels 12, the handle 13 and the holding plate 14 and serving as a pivot of the handle 13 and the holding plate 14.

The holding plate 14 has a pivot end 141, a free end 142, a panel portion 143 extending between the pivot end 141 and the free end 142, and a locking slit 144 adjacent to the free end 142. The holding plate 14 can be pivoted between a flip-up position where the free end 142 and the panel portion 143 are away from the supporting tray 11, and a flip-down position where the free end 142 and the panel portion 143 are close to the supporting tray 11.

The latch device 15 includes a sleeve member 151 positioned on the supporting tray 11, and a twist lock member 152 extended through the sleeve member 151 and being rotatable between a locked position and an unlocked position relative to the locking slit 144.

The conventional luggage cart further includes a luggage container 17 that includes a container body 171 and a loop strap 172 attached to the bottom side of the container body 171.

Before use, the holding plate 14 is at the flip-down position, and the twist lock member 152 extends through the locking slit 144 of the holding plate 14. The locking slit 144 and a top head portion of the twist lock member are not circular, so that the twist lock member 152 does not appropriately match the locking slit 144 at the locked position, and appropriately matches the locking slit 144 when being rotated to the unlocked position. In case the luggage container 17 is to be fastened to the supporting tray 11, a user should first turn the twist lock member 152 to the unlocked position, so that the holding plate 14 can be pivoted up to the flip-up position allowing loop strap 172 of the container 17 to be set to the holding plate 14. Next, the holding plate 14 is pivoted down to the flip-down position, with the twist lock member 152 passing once again through the locking slit 144, then the twist lock member 152 is turned to the locked position to thereby fasten the luggage container 17 to the supporting tray 11 of the luggage cart. On the other hand, in case it is desired to unfasten the luggage container 17 from the supporting tray 11, the user should first turn the twist lock member 152 to the unlocked position, so that the holding plate 14 can be pivoted up to the flip-up position, thus the luggage container 17 is allowed to be moved forward to release the loop strap 172 from the holding plate 14.

The luggage cart as disclosed in the above patent has the disadvantages that, when the luggage container 17 is desired to be fastened to or unfastened from the supporting tray 11, it should first to turn the twist lock member 152 to allow pivotal movement of the holding plate 14, which is cumbersome and complicated.

SUMMARY OF THE INVENTION

Therefore, the object of the disclosure is to provide a luggage cart that is easy to operate.

According to the disclosure, a luggage cart includes a supporting tray, two wheels mounted to the supporting tray, a handle pivotally mounted to the supporting tray, and a latching mechanism. The latching mechanism includes a top seat, a fastening member, an actuating member, a bottom seat, a latch bolt, and a resilient member.

The top seat is mounted to the supporting tray and includes a top plate.

The fastening member includes a shaft portion, a flange cap portion, and a first locking part. The shaft portion extends removably in a top-bottom direction through the top plate. The flange cap portion is disposed at an upper side of the top plate, is connected to a top end of the shaft portion, and is adapted for securing to a bottom of a luggage container. The first locking part is provided on the shaft portion.

The actuating member includes a pressing plate and an actuating finger. The pressing plate is disposed movably at an upper side of the top plate. The actuating finger is connected co-movably to the pressing plate, extends in the top-bottom direction through the top plate, and has a first slanted cam surface.

The bottom seat is fixed to the supporting tray and is coupled to the top seat. The bottom seat includes a bottom plate that is distal from the top plate of the top seat, and two restricting walls that cooperate with the top plate to define a positioning groove thereamong. The first locking part of the fastening member is removably disposed between the bottom plate of the bottom seat and the top plate of the top seat.

The latch bolt includes a main body, a second locking part, and a driven end. The main body is received in the positioning groove and is elongated in a front-rear direction which is transverse to the top-bottom direction. The second locking part extends forward from the main body. The driven end extends rearward from the main body and is disposed under the actuating finger. The driven end has a second slanted cam surface that is slidingly engaged with the first slanted cam surface of the actuating finger. The actuating member is downward movable to drive the latch bolt to move rearward from a locking position, where the locking part of the latch bolt engages the first locking part of the fastening member to secure the fastening member to the top plate of the top seat, to an unlocking position, where the locking part of the latch bolt is disengaged from the first locking part of the fastening member to permit removal of the fastening member from the top plate of the top seat.

The resilient member is mounted between the bottom seat and the latch bolt for biasing latch bolt toward the locking position.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
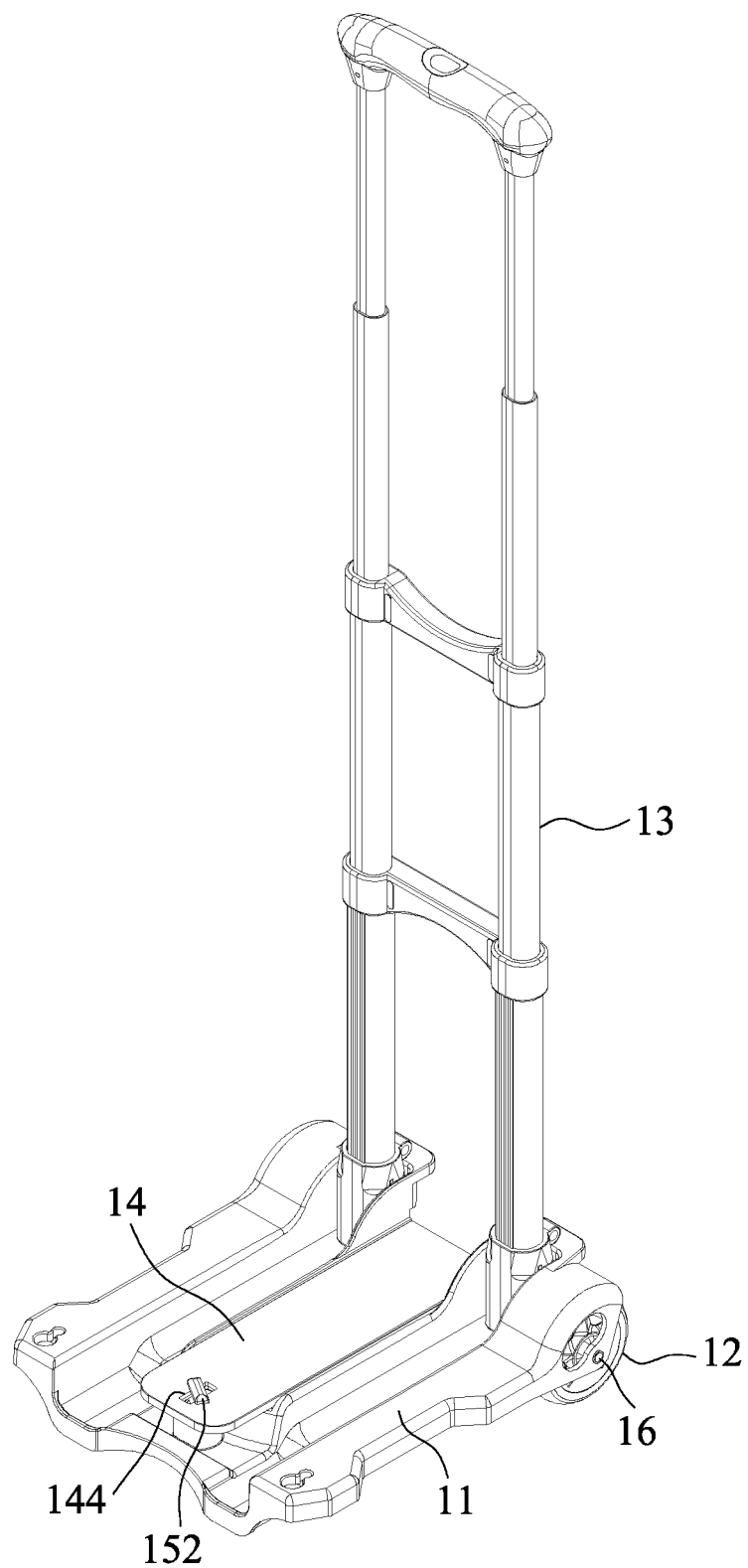
FIG. 1 is a fragmentary perspective view of a conventional luggage cart disclosed in Chinese Utility Model Patent No. CN204124159U.
Figure 2:
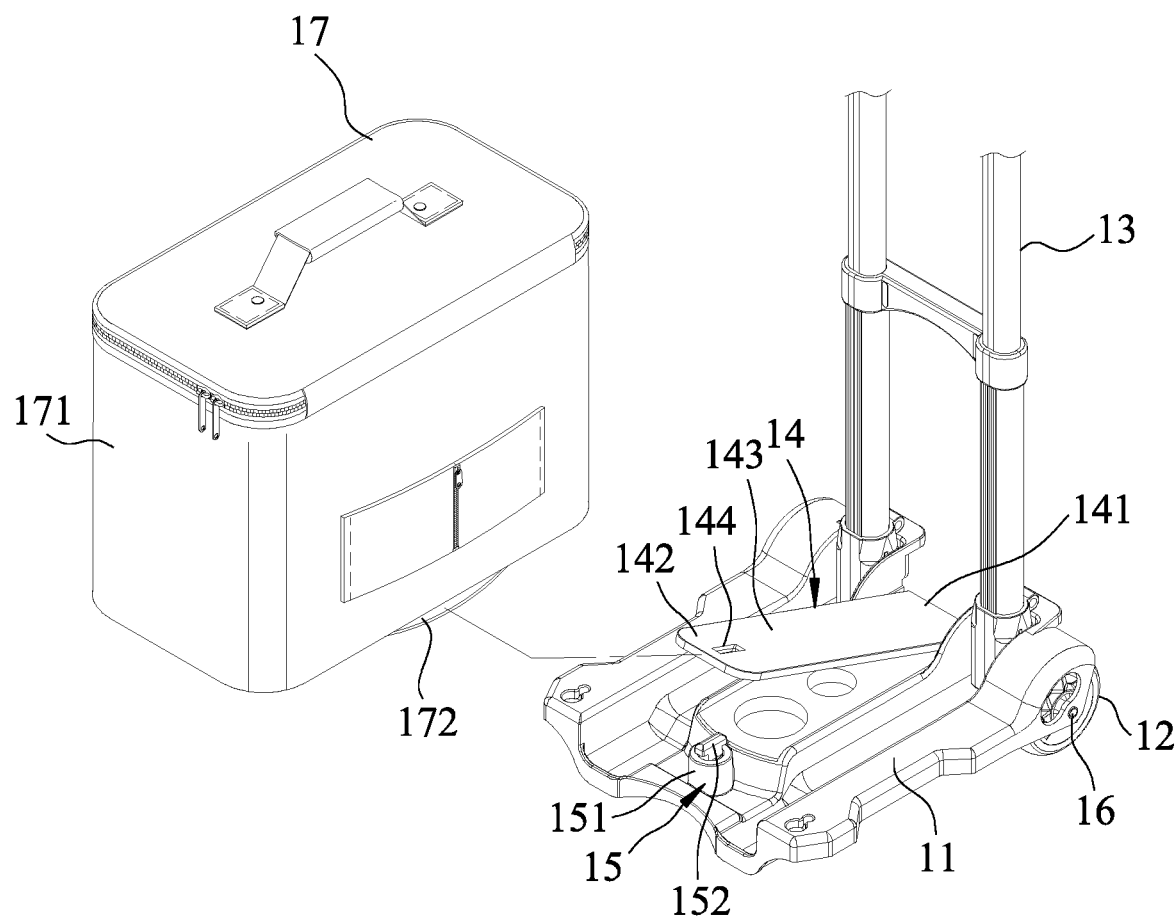
FIG. 2 is a fragmentary exploded perspective view of the conventional luggage cart disclosed in Chinese Utility Model Patent No. CN204124159U, illustrating a holding plate in a flip-up position and a luggage container being detached from a supporting tray.
Figure 3:
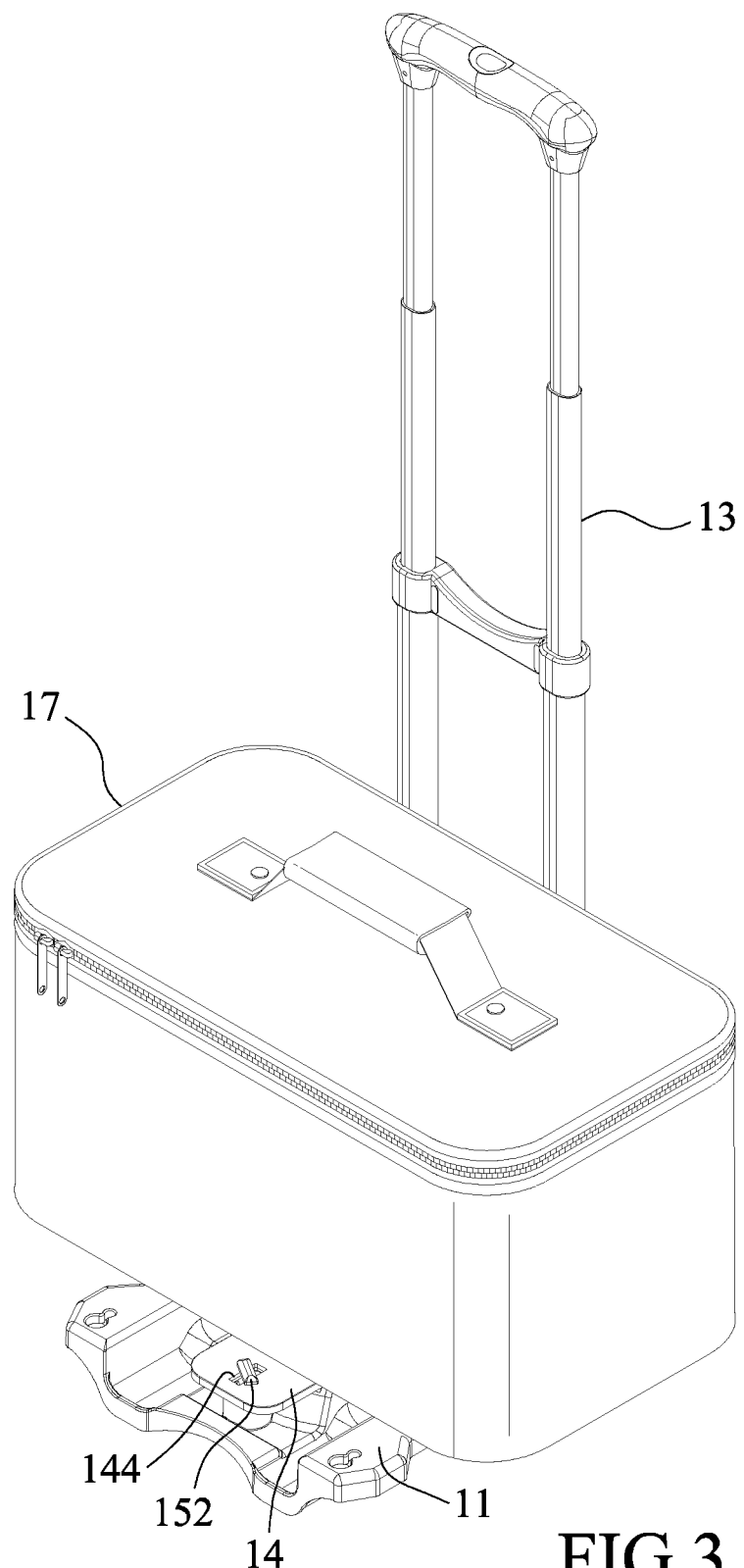
FIG. 3 is a perspective view of the conventional luggage cart disclosed in Chinese Utility Model Patent No. CN204124159U, illustrating the holding plate in a flip-down position and the luggage container being supported and fastened to the supporting tray.

Before the present invention is described in greater detail, it should be noted that where considered appropriate, reference numerals or terminal portions of reference numerals have been repeated among the figures to indicate corresponding or analogous elements, which may optionally have similar characteristics.

It should be noted that the relative position terms used in the following description, such as "front", "rear", "left", "right", "top" and "bottom" are based on the orientation shown in each figure as well as the normal usage orientation.

Figure 4:
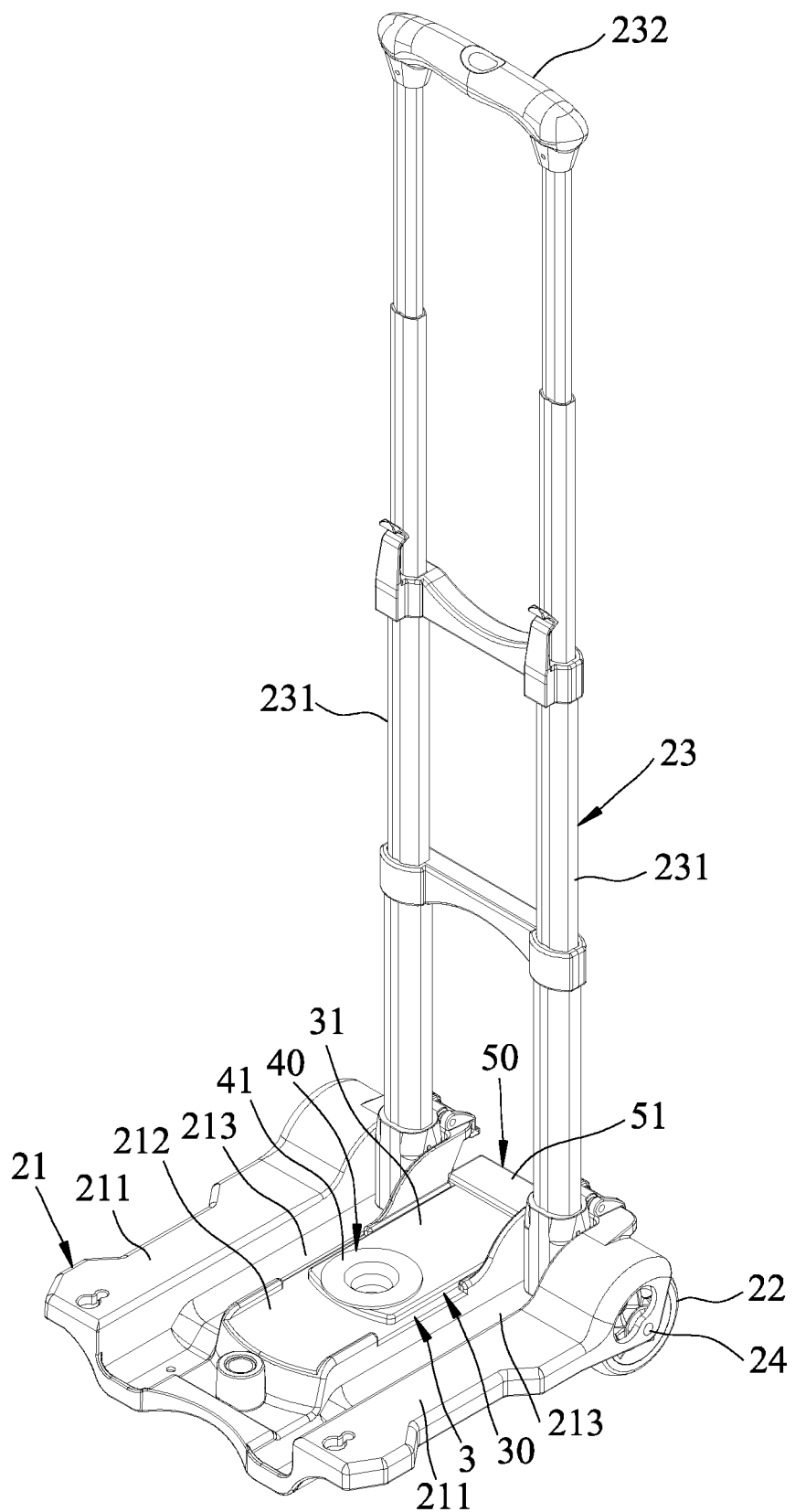
FIG. 4 is a perspective view of an embodiment of the luggage cart according to the present disclosure.
Figure 5:
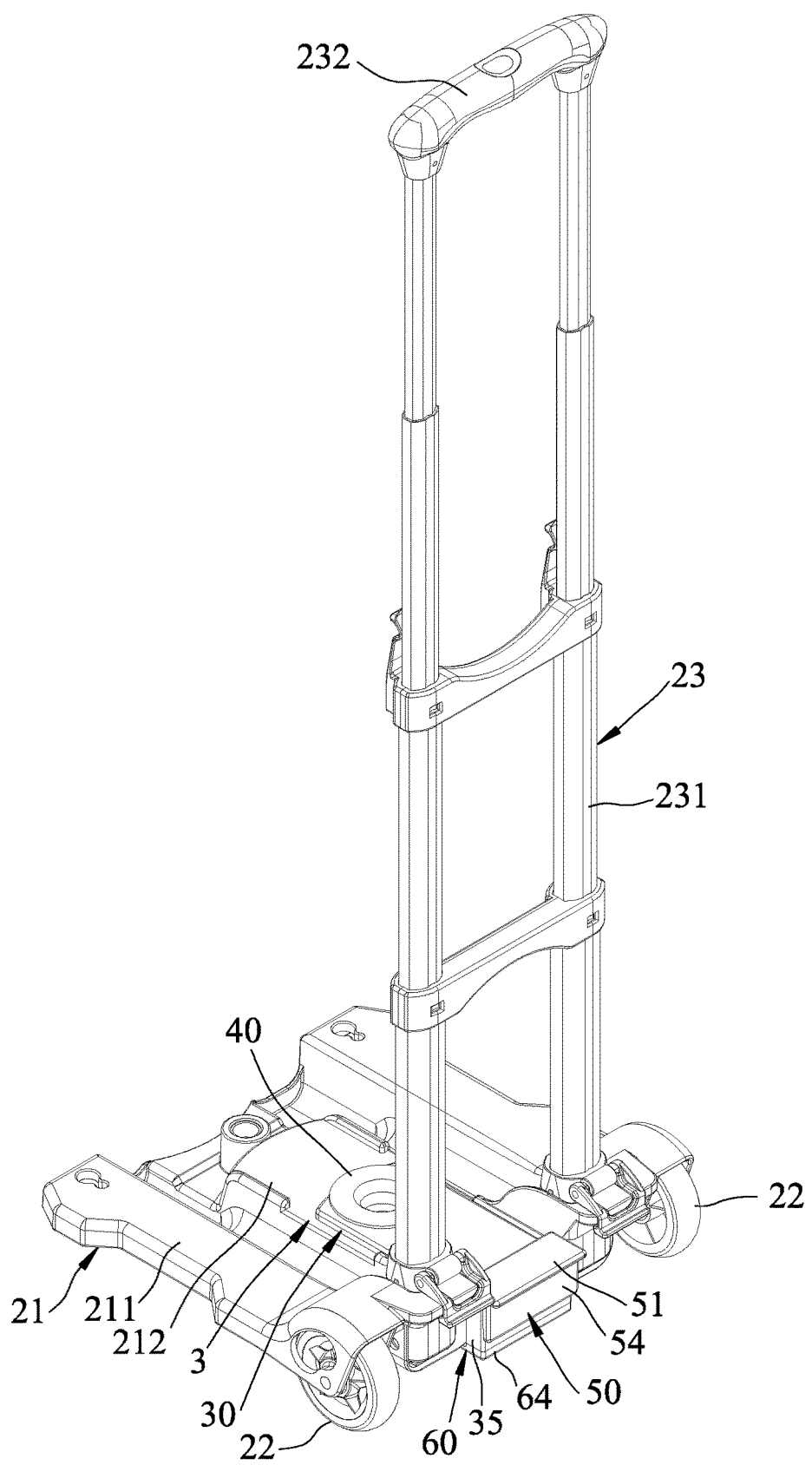
FIG. 5 is another perspective view of the embodiment.
Figure 6:
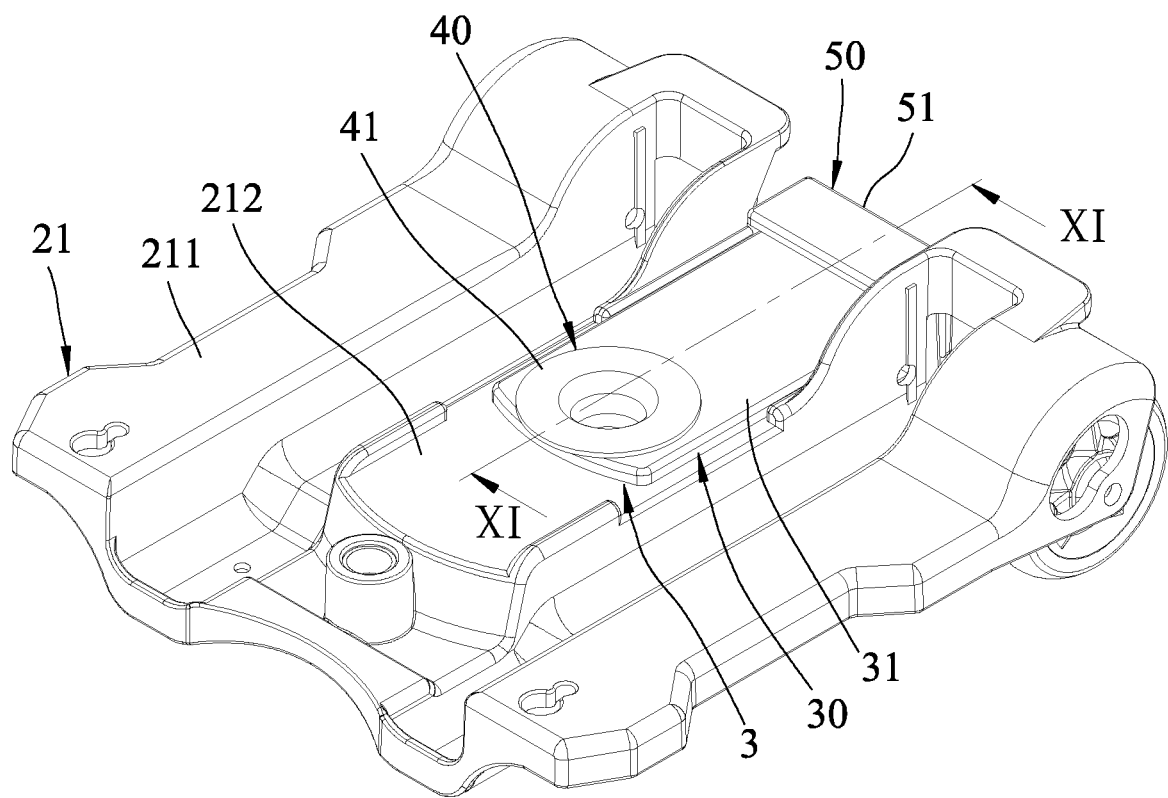
FIG. 6 is a fragmentary perspective view of the embodiment.
Figure 7:
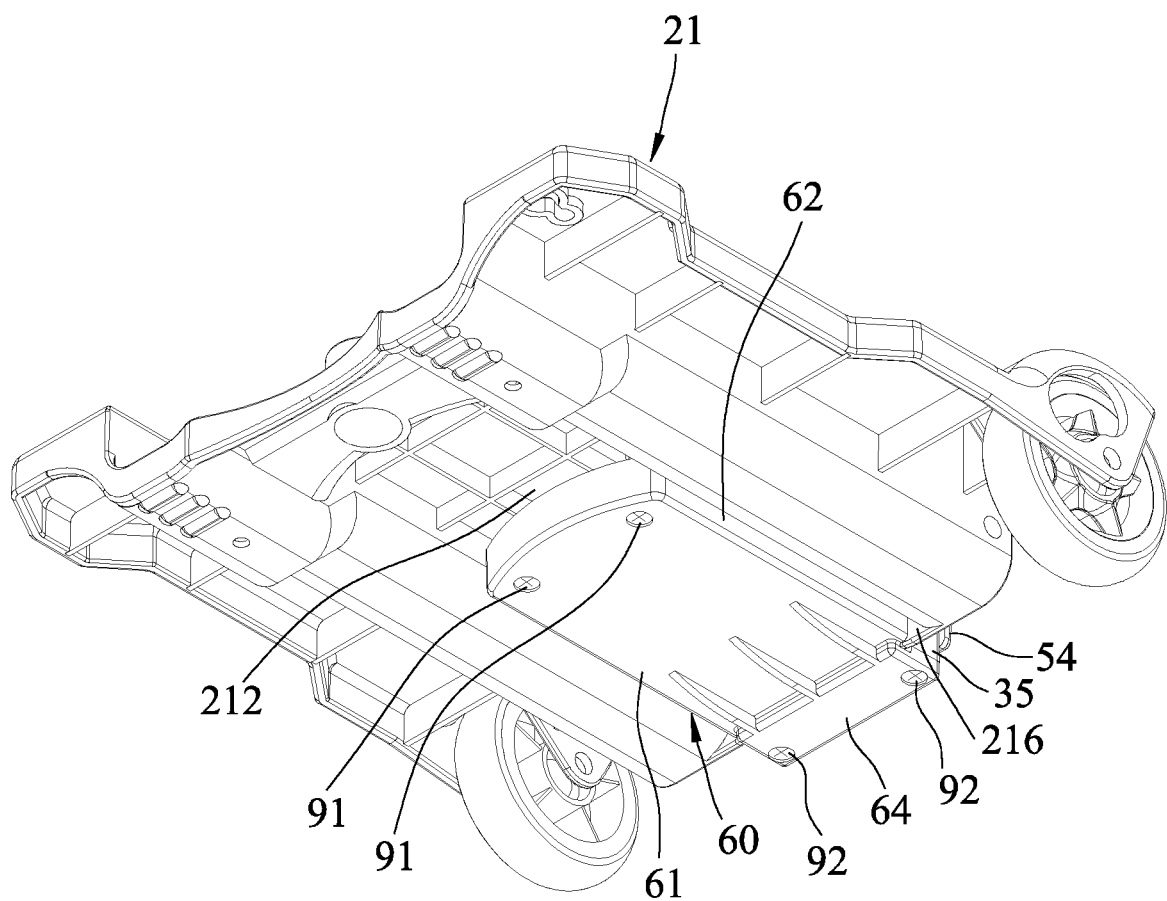
FIG. 7 is another fragmentary perspective view of the embodiment.
Figure 8:
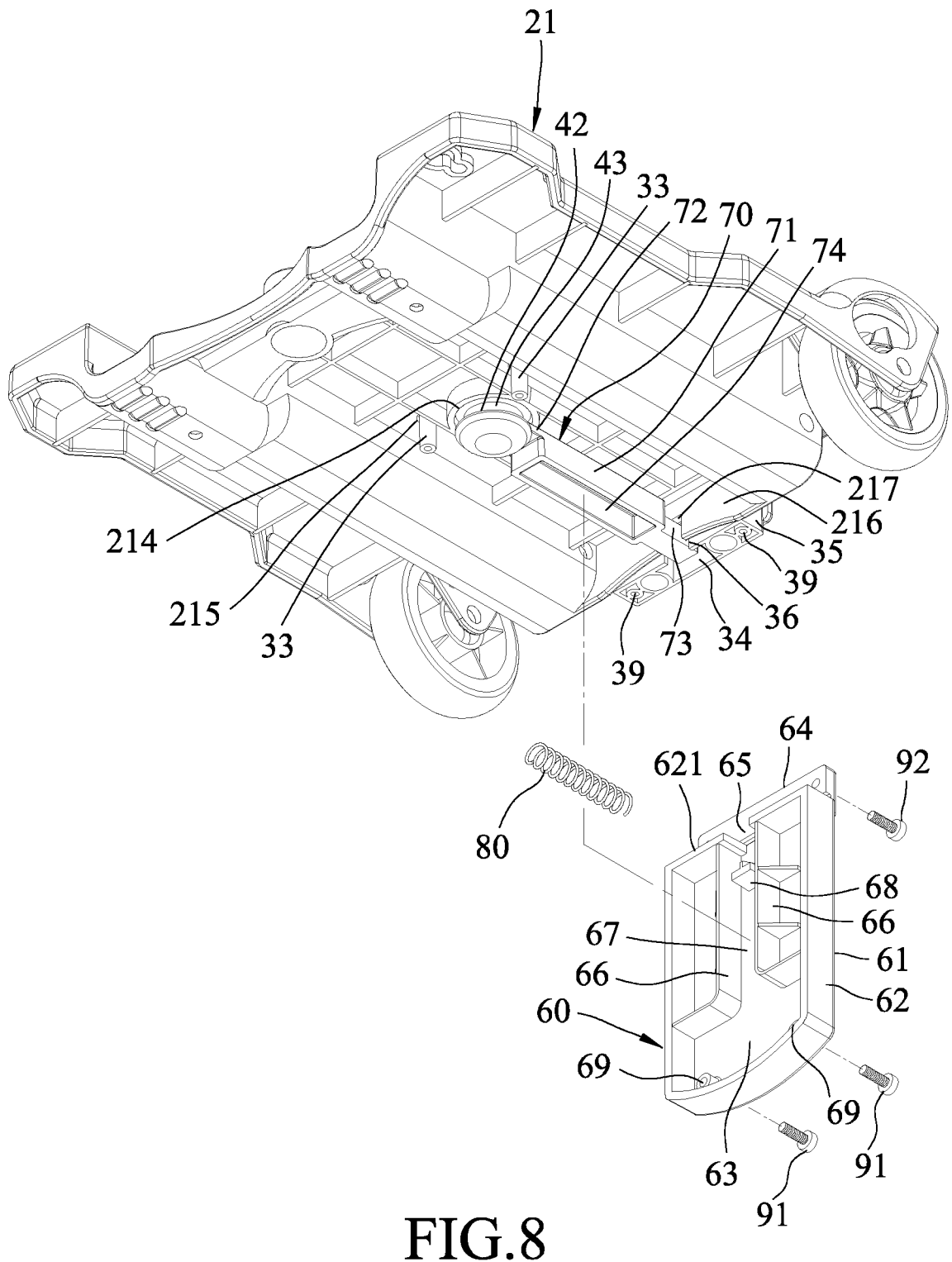
FIG. 8 is a fragmentary partly exploded perspective view of the embodiment.
Figure 9:
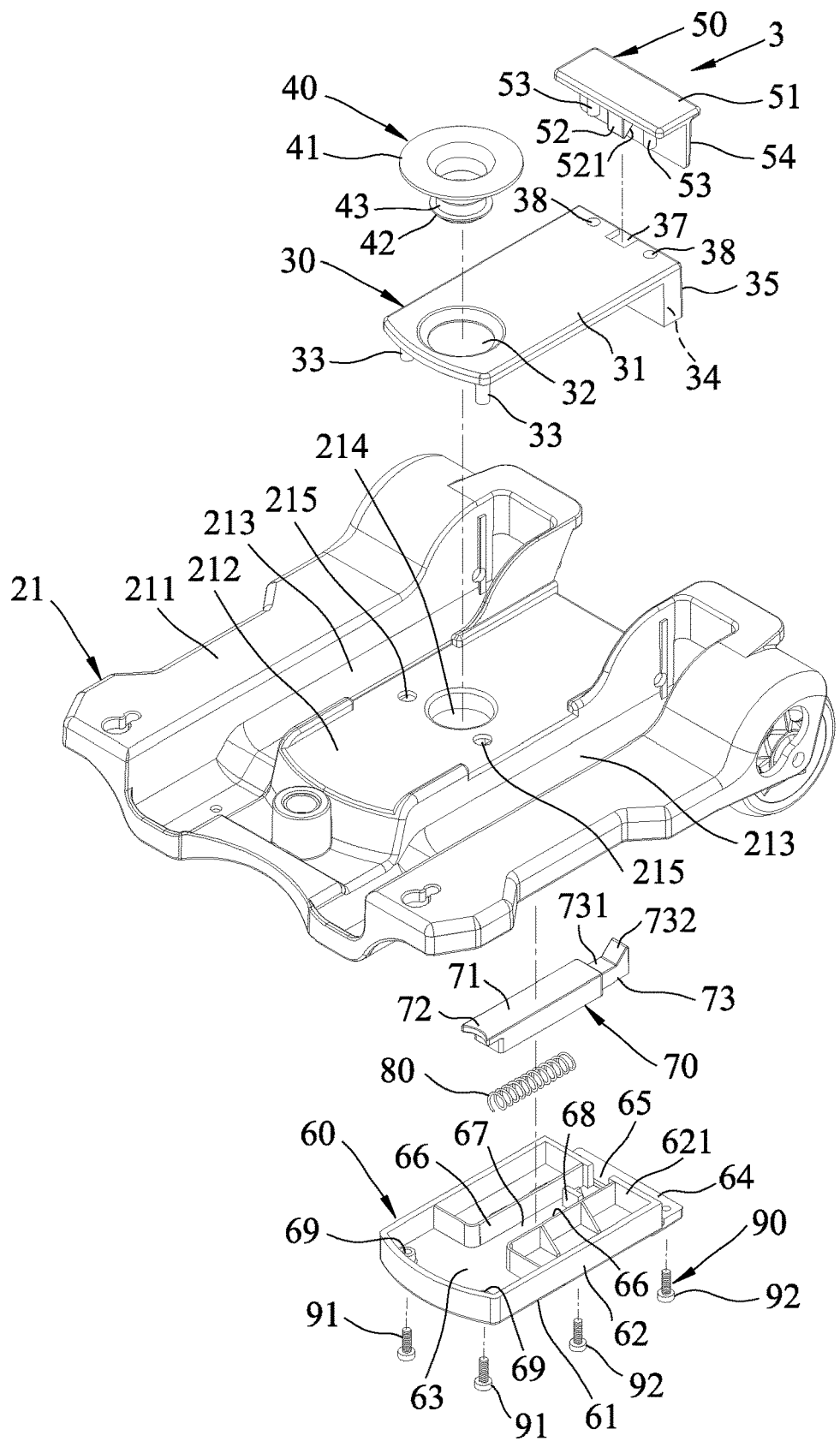
FIG. 9 is a fragmentary exploded perspective view of the embodiment.
Figure 10:
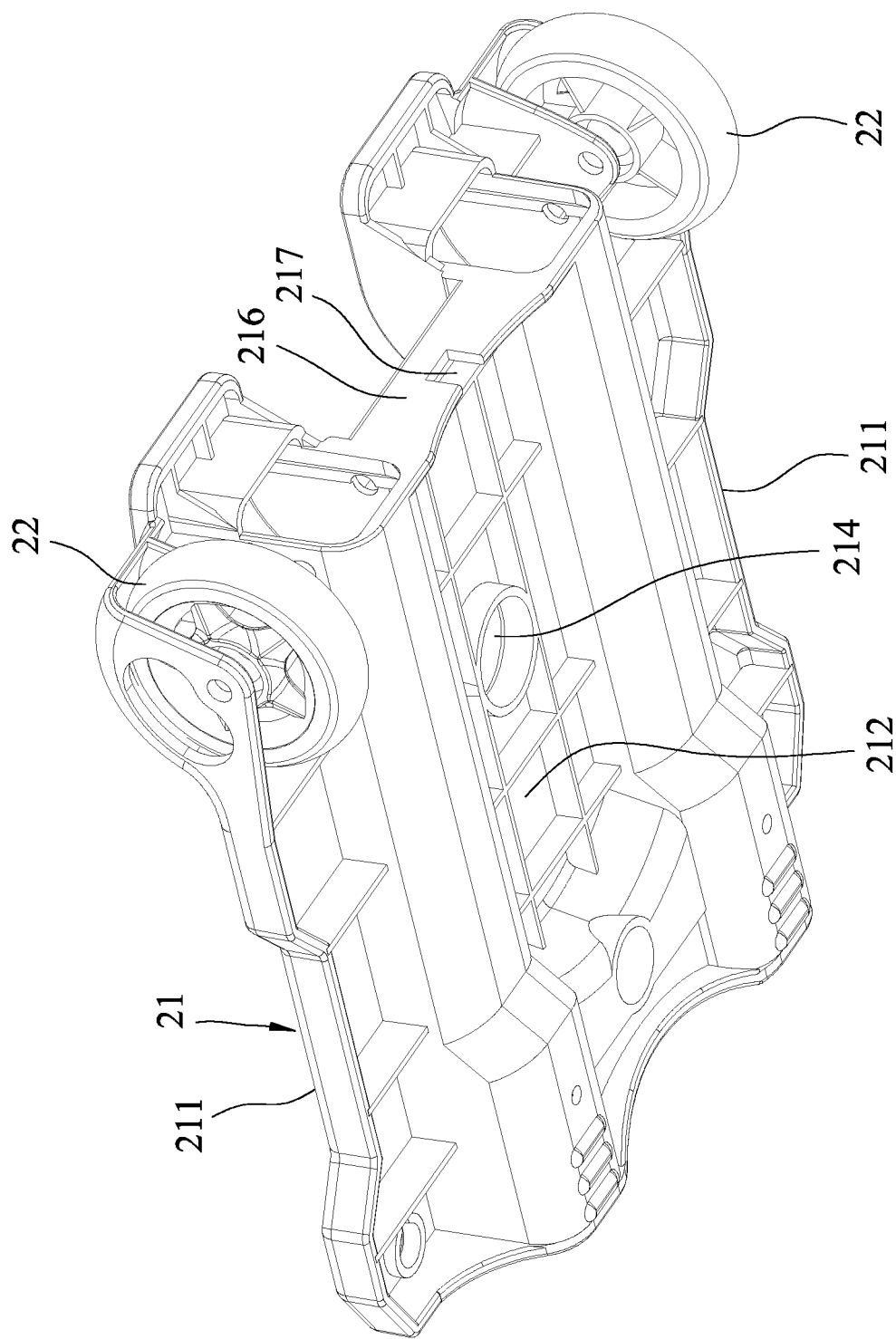
FIG. 10 is a perspective view of the supporting tray and two wheels.
Figure 11:
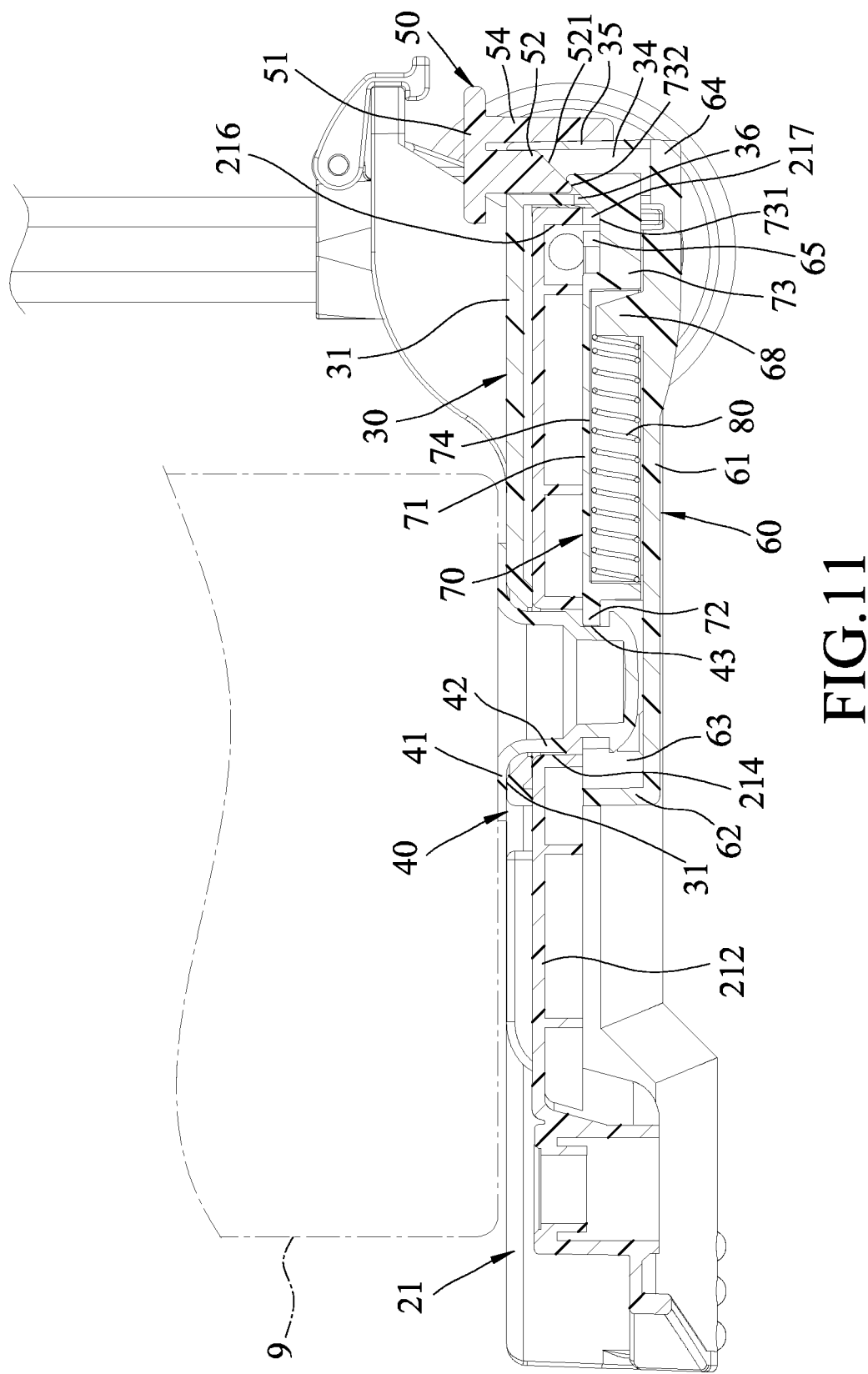
FIG. 11 a schematic fragmentary cross-sectional view taken along line XI-XI in FIG. 6, showing a latch bolt positioned at a locking position, and a luggage container fastened on the supporting tray.

As shown in FIGS. 4, 5 and 11, the embodiment of a luggage cart according to the present disclosure is used for carrying a luggage container 9. The luggage container 9 may be a hard suitcase or a soft bag. The embodiment includes a supporting tray 21, two wheels 22 mounted on the rear side of the supporting tray 21, a handle 23 pivotally connected to the rear side of the supporting tray 21, an axle 24 mounted in the rear side of the supporting tray 21 and extending transversely through the wheels 22 and the handle 23, and a latching mechanism 3 mounted to the supporting tray 21. The handle 23 includes two telescoping bars 231 mounted to and pivotable about the axle 24, and a grip section 232 interconnecting the upper ends of the two telescoping bars 231.

Referring to FIGS. 6 to 11, the supporting tray 21 has two supporting sections 211 arranged in a left-right direction, a recessed section 212 located between the two supporting sections 211, and two bar nesting slots 213. Each bar nesting slot 213 is located between the recessed section 212 and a respective one of the supporting sections 211. The supporting tray 21 further has a first perforation 214 and two bores 215 extending through the recessed section 212 in a top-bottom direction, and a rear panel 216 extending downward from rear ends of the supporting sections 211 and the recessed section 212 and formed with a downward-facing first notch 217.

The latching mechanism 3 includes a top seat 30, a fastening member 40, an actuating member 50, a bottom seat 60, a latch bolt 70, a resilient member 80 and a fastener unit 90.

The top seat 30 is mounted to the supporting tray 21, and includes a top plate 31 lying on the recessed section 212 and having a second perforation 32 that extends therethrough and that is in alignment with the first perforation 214. The top seat 30 further includes two front locating posts 33 extending downward from the top plate 31 and respectively through the bores 215, and a latch block 35 extending downward from the top plate 31 behind the rear panel 216 of the supporting tray 21, defining an inner compartment 34, and formed with a downward-facing second notch 36 that is in alignment with the first notch 217 in a front-rear direction and that is communicated with the inner compartment 34. The top plate 31 further has a third perforation 37 and two guide holes 38 extending therethrough in the top-bottom direction and communicated with the inner compartment 34. The top seat 30 further includes two rear locating posts 39 provided to the latch block 35 and located within the inner compartment 34.

The fastening members 40 includes a shaft portion 42, a flange cap portion 41, and a first locking part 43. The shaft portion 42 extends removably in the top-bottom direction through the second perforation 32 of the top plate 31 and the first perforation 214 of the supporting tray 21. The flange cap portion 41 is disposed at an upper side of the top plate 31, is connected to a top end of the shaft portion 42, and is adapted for securing to a bottom of the luggage container 9. Specifically, the flange cap portion 41 has a diameter larger than that of the second perforation 32, so that the flange cap portion 41 is blocked outside the second perforation 32 on the top plate 31. The shaft portion 42 is less in diameter than that of the flange cap portion 41. The first locking part 43 is provided on the shaft portion 42, and is located below the recessed section 212. In this embodiment, the first locking part 43 is a circumferential groove around the shaft portion 42, but may also be a concavity or indentation on the shaft portion 42. In addition, the second perforation 32 and the first perforation 214, as well as the flange cap portion 41 and the shaft portion 42, are not limited to be round-shaped.

The actuating member 50 includes a pressing plate 51 disposed movably at the upper side of the top plate 31, an actuating finger 52 connected co-movably to the pressing plate 51 and extending downward through the third perforation 37 of the top plate 31 into the inner compartment 34, two guide rods 53 extending downward from the pressing plate 51 and respectively and movably into the guide holes 38 of the top plate 31, and an end plate 54 extending downward from the pressing plate 51 and being in abutment against a rear side of the latch block 35. The actuating finger 52 has a first slanted cam surface 521 on the lower end thereof that is configured to have a rear end and a front end lower than the rear end.

The bottom seat 60 is fixed to a bottom side of the supporting tray 21 and is coupled to the top seat 30. The bottom seat 60 includes a bottom plate 61 being distal from the top plate 31 of the top seat 30, and a surrounding wall 62 extending upward from a periphery of the bottom plate 61. The surrounding wall 62 is in abutment against an underside of the supporting tray 21, is in front of the rear panel 216, and is formed with a third notch 65 that is in alignment with the first notch 217 of the rear panel 216 of the supporting tray 21 in the front-rear direction. The bottom seat 60 further includes a rear connecting board 64 disposed rearward of the bottom plate 61 and being in abutment against an underside of the latch block 35, and two spaced-apart restricting walls 66 formed on the bottom plate 61. The surrounding wall 62 surrounds the restricting walls 66 and cooperates with the bottom plate 61 and the restricting walls 66 to define a receiving space 63 thereamong. The restricting walls 66 are located in the receiving space 63 and cooperate with the top plate 31 to define a positioning groove 67 extending in the front-rear direction and communicated with the third notch 65. The shaft portion 42 of the fastening member 40 extends removably through the second perforation 32 of the top plate 31 and the first perforation 214 of the supporting tray 21 into the receiving space 63, and the first locking part 43 of the fastening member 40 is removably disposed between the bottom plate 61 of the bottom seat 60 and the recessed section 212 of the supporting tray 21 (i.e., the first locking part 43 is removably disposed in the receiving space 63). The bottom seat 60 further includes an abutment block 68 formed on the bottom plate 61 and located in the positioning groove 67, and two threaded posts 69 formed on the bottom plate 61 and being respectively in alignment with the two bores 215 of the supporting tray 21.

The latch bolt 70 includes a main body 71 received in the positioning groove 67 and being elongated in the front-rear direction, a second locking part 72 extending forward from the main body 71, and a driven end 73 extending rearward from the main body 71 and protruding through the third notch 65, the first notch 217 and the second notch 36 into the inner compartment 34 and disposed under the actuating finger 52. The main body 71 has a downward-facing receiving compartment 74. The abutment block 68 of the bottom seat 60 extends upward from the bottom plate 61 into the receiving compartment 74. The driven end 73 has a top surface 731, and a second slanted cam surface 732 being inclined from the top surface 731 toward the rear end of the driven end 73 and slidingly engaged with the first slanted cam surface 521 of the actuating finger 52.

Figure 12:
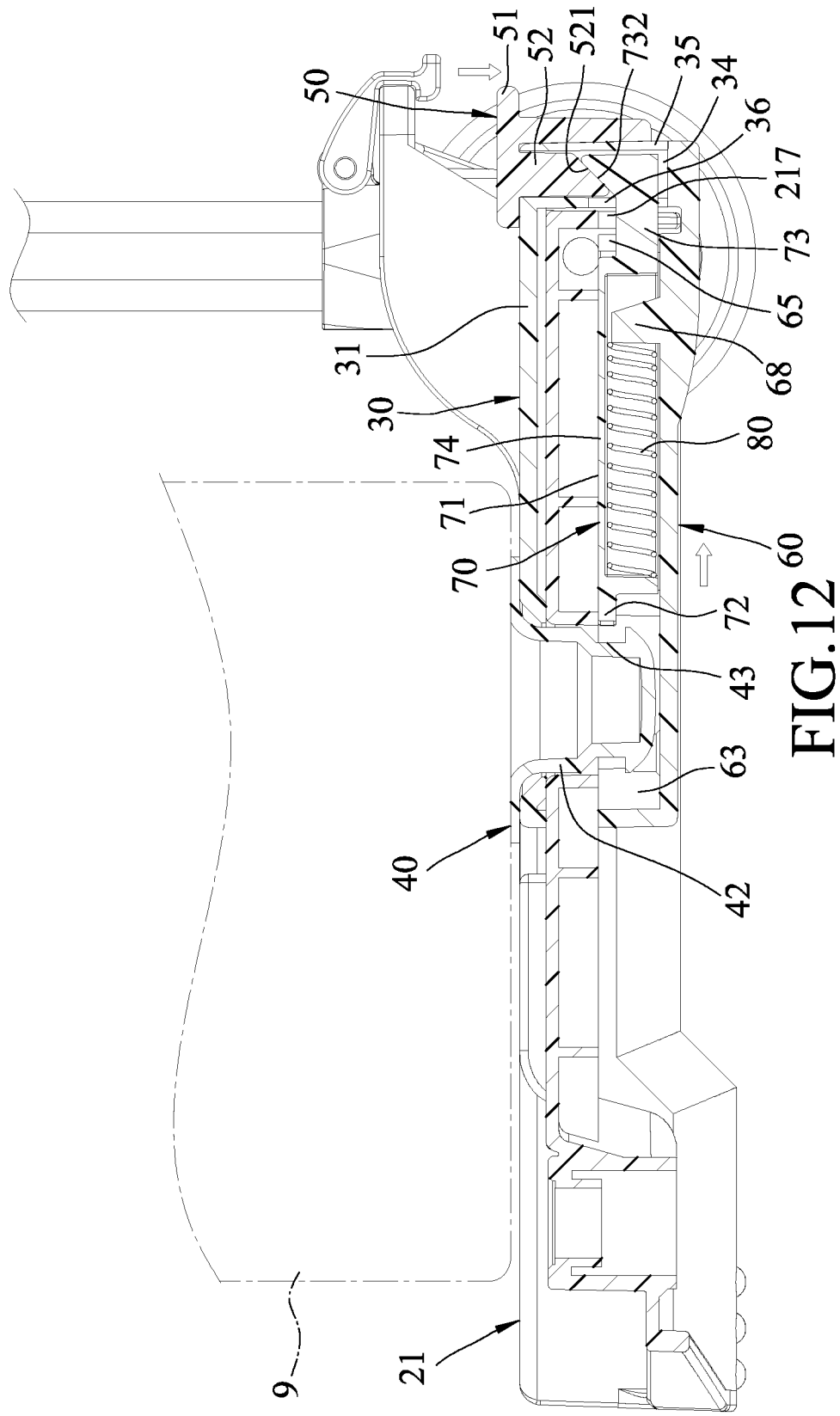
FIG. 12 is a view similar to FIG. 11 showing the latch bolt in an unlocking position.
Figure 13:
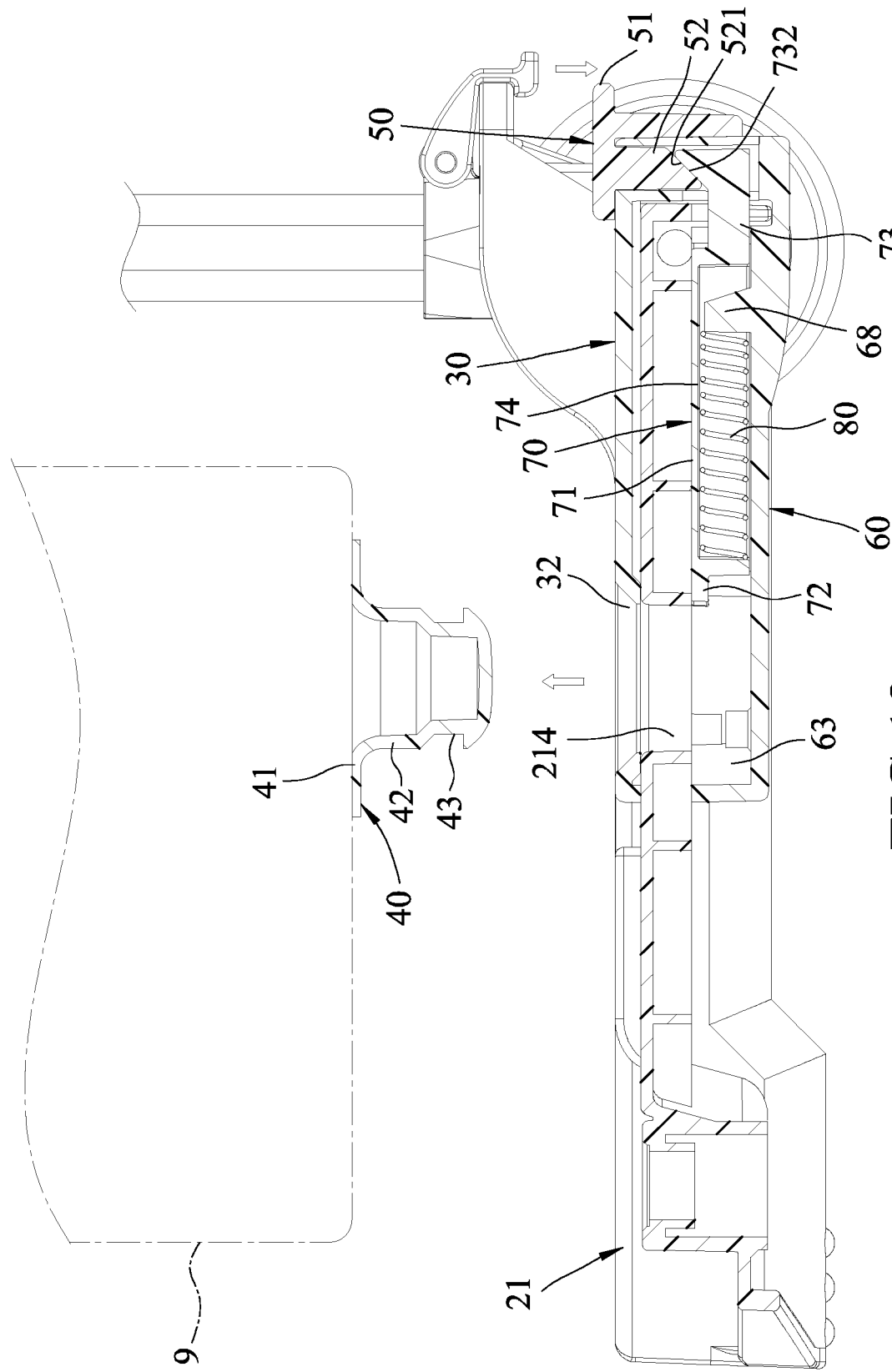
FIG. 13 is a view similar to FIG. 12 with the luggage container detached from the supporting tray.

The actuating member 50 is downward movable to drive the latch bolt 70 to move rearward from a locking position (see FIG. 11), where the locking part 72 of the latch bolt 70 engages the first locking part 43 of the fastening member 40 to secure the fastening member 40 to the top plate 31 of the top seat 30, to an unlocking position (see FIG. 12), where the locking part 72 of the latch bolt 70 is disengaged from the first locking part 43 of the fastening member 40 to permit removal of the fastening member 40 from the top plate 31 (see FIG. 13).

The resilient member 80 is mounted in the receiving compartment 74 of the latch bolt 70 and has opposite ends abutting respectively against the main body 71 and the abutment block 68 of the bottom seat 60, such that the latch bolt 70 is biased toward the locking position. In this embodiment, the resilient member 80 is a compression spring, but may be other resilient member in other embodiments.

The resilient member 80 enables releasable locking of the second locking part 72 with the first locking part 43. In case the first locking part 43 is a circumferential groove around the shaft portion 42, the second locking part 72 has a bifurcated structure. Otherwise, when the first locking part 43 is a concavity or indentation on the shaft portion 42, the second locking part 72 can be an end protrusion capable of engaging with the concavity or indentation.

The fastener unit 90 includes two front screws 91 and two rear screws 92. Each front screw 91 threadedly engages a respective one of the two threaded posts 69 and a respective one of the two front locating posts 33. Each rear screw 92 threadedly engages the connecting board 64 and a respective one of the rear locating posts 39, thus, the top seat 30 and the bottom seat 60 can be screwed together and fixed to the supporting tray 21.

Referring to FIGS. 6, 9, 11 and 12, if it is desired to fasten the luggage container 9 on the luggage cart, the user simply depress the pressing plate 51 of the actuating member 50, and the second slanted cam surface 732 of the latch bolt 70 will be pushed backward by the first slanted cam surface 521 of the actuating member 50 and in turn retract the latch bolt 70 backward to the unlocking position where the resilient member 80 is compressed. Then, the user can insert the fastening member 40, which is attached to the bottom of the luggage container 9 in advance, through the second perforation 32 and the first perforation 214 to enter the receiving space 63 of the bottom seat 60, and release the pressing plate 51 to move the latch bolt 70 to the locking position under the restoring force of the resilient member 80. In this locking position, through the engagement between the second locking part 72 and the first locking part 43, the luggage container 9 can be fastened on the luggage cart with the fastening member 40. On the other hand, when the latch bolt 70 moves to the locking position, the second slanted cam surface 732 slidingly pushes the first slanted cam surface 521 upward simultaneously and thus reset the actuating member 50. In addition, with the cooperation of the guide holes 38 and the guide posts 53, the downward movement of the pressing plate 51 when being pressed will be smoother.

Referring to FIGS. 12 and 13, to unfasten the luggage container 9 from the luggage cart, the user only needs to depress the pressing plate 51 of the actuating member 50 to move the latch bolt 70 rearward to the unlocking position where the second locking part 72 is disengaged from the first locking part 43. In this unlocking position, when the user lifts the luggage container 9, the fastening member 40 can be pulled and separated from the latch bolt 70, the first perforation 214 and the second perforation 32, so that the luggage container 9 is unfastened from the luggage cart.

Figure 14:
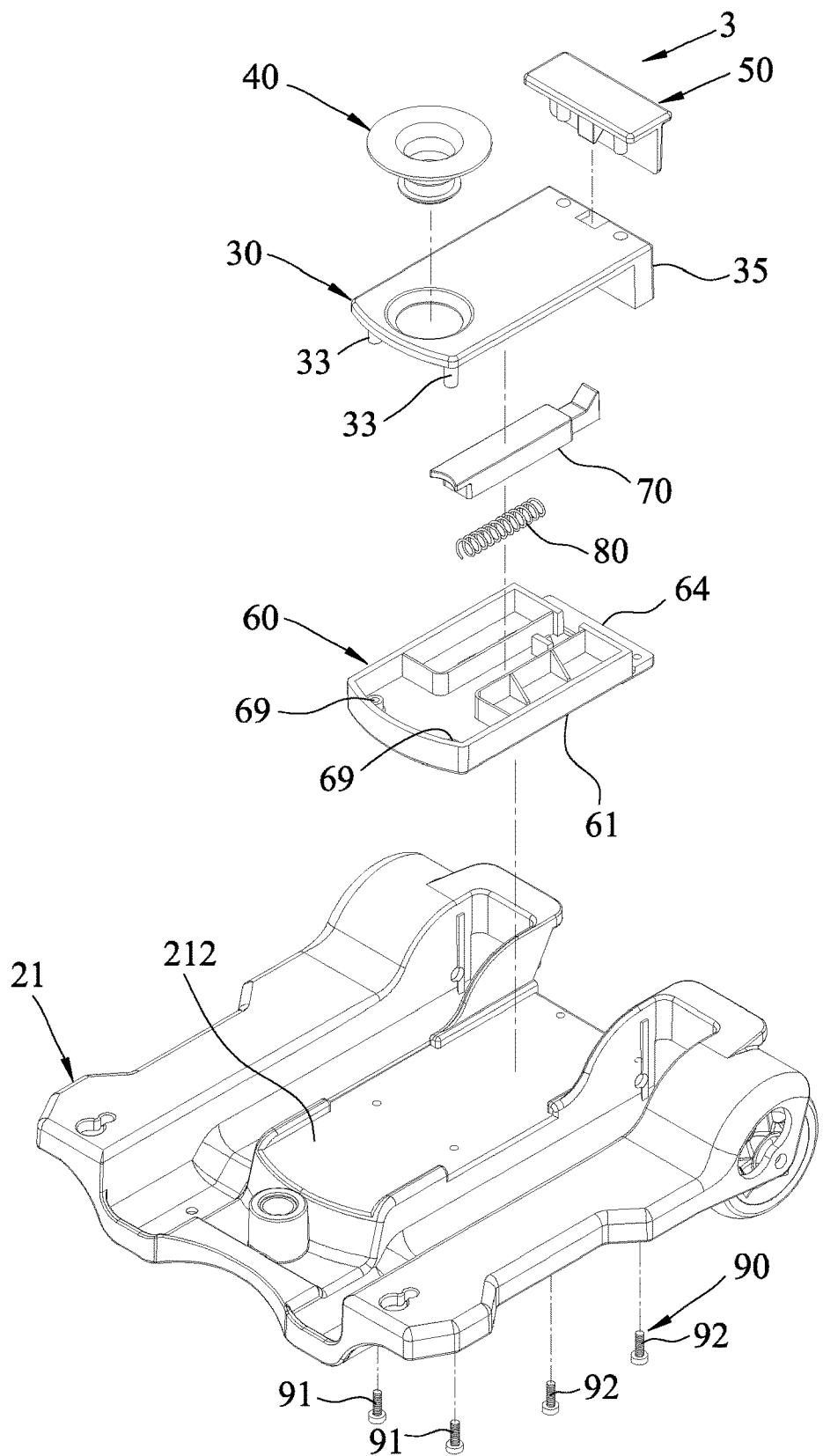
FIG. 14 is a view similar to FIG. 9 showing a variation of the embodiment.

Referring to FIG. 14, in a variation of the embodiment, the latching mechanism 3 may also be assembled as a whole to the supporting tray 21 on the upper side of the recessed section 212, and fixed to the supporting tray 21 by means of the fastener unit 90. With this arrangement, the luggage container 9 can be similarly fastened to or separated from the supporting tray 21 through the latch bolt 70 which is engaged with or disengaged from the fastening member 40.

In summary, according to the present invention, the latch bolt 70 is normally biased to a locking position to maintain the fastening member 40 in its locked position such that the luggage container 9 can be fastened to the supporting tray 21. If it is desired to detach the luggage container 9 from the supporting tray 21, the user just has to depress the pressing plate 51, and the downward movement of the actuating finger 52 will push the latch bolt 70 backward to the unlocking position with respect to the fastening member 40, thus the luggage container 9 can be separated from the supporting tray 21. Therefore, the present invention has the advantage of ease of use.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiments but is intended to cover various arrangements included within the spirit and scope of the broadest interpretation so as to encompass all such modifications and equivalent arrangements.

What is claimed is:

1. A luggage cart comprising:
   a supporting tray;
   two wheels mounted to said supporting tray;
   a handle pivotally mounted to said supporting tray; and
   a latching mechanism including
      a top seat that is mounted to said supporting tray and that includes a top plate,
      a fastening member that includes
         a shaft portion extending removably in a top-bottom direction through said top plate,
         a flange cap portion disposed at an upper side of said top plate, connected to a top end of said shaft portion, and adapted for securing to a bottom of a luggage container, and
         a first locking part provided on said shaft portion,
      an actuating member that includes
         a pressing plate disposed movably at an upper side of said top plate, and
         an actuating finger connected co-movably to said pressing plate, extending in said top-bottom direction through said top plate, and having a first slanted cam surface,
      a bottom seat that is fixed to said supporting tray and that is coupled to said top seat, said bottom seat including a bottom plate that is distal from said top plate of said top seat, and two restricting walls that cooperate with said top plate to define a positioning groove thereamong, said first locking part of said fastening member being removably disposed between said bottom plate of said bottom seat and said top plate of said top seat,
      a latch bolt that includes
         a main body received in said positioning groove and being elongated in a front-rear direction which is transverse to said top-bottom direction,
         a second locking part extending forward from said main body, and
         a driven end extending rearward from said main body and disposed under said actuating finger, said driven end having a second slanted cam surface that is slidingly engaged with said first slanted cam surface of said actuating finger, said actuating member being downward movable to drive said latch bolt to move rearward from a locking position, where said second locking part of said latch bolt engages said first locking part of said fastening member to secure said fastening member to said top plate of said top seat, to an unlocking position, where said second locking part of said latch bolt is disengaged from said first locking part of said fastening member to permit removal of said fastening member from said top plate of said top seat, and
      a resilient member mounted between said bottom seat and said latch bolt for biasing said latch bolt toward said locking position.

2. The luggage cart as claimed in claim 1, wherein:
   said supporting tray has a first perforation extending therethrough in said top-bottom direction;
   said top seat is mounted on a top side of said supporting tray, said top plate having a second perforation that extends therethrough and that is in alignment with said first perforation;
   said bottom seat is mounted on a bottom side of said supporting tray, and further includes a surrounding wall extending upward from said bottom plate, surrounding said restricting walls, and cooperating with said bottom plate and said restricting walls to define a receiving space thereamong;
   said shaft portion of said fastening member extends removably in the top-bottom direction through said second perforation and said first perforation into said receiving space with said first locking part of said fastening member being removably disposed in said receiving space; and
   said luggage cart further comprises a fastener unit fastening said bottom seat to said top seat.

3. The luggage cart as claimed in claim 2, wherein:
   said latch bolt has a downward-facing receiving compartment;
   said bottom seat further includes an abutment block extending upward from said bottom plate into said receiving compartment; and
   said resilient member is disposed in said receiving compartment and has opposite ends abutting respectively against said main body and said abutment block.

4. The luggage cart as claimed in claim 2, wherein said first locking part of said fastening member is a circumferential groove, and said second locking part of said latch bolt has a bifurcated structure.

5. The luggage cart as claimed in claim 2, wherein:
   said supporting tray further has a rear panel formed with a first notch;
   said top seat further includes a latch block extending downward from said top plate behind said rear panel, defining an inner compartment, and formed with a second notch that is communicated with said inner compartment and that is in alignment with said first notch in said front-rear direction;
   said top plate of said top seat further has a third perforation extending therethrough in said top-bottom direction and communicated with said inner compartment, said actuating finger extending through said third perforation into said inner compartment;
   said surrounding wall of said bottom seat is in abutment against an underside of said supporting tray, is in front of said rear panel, and is formed with a third notch in alignment with said first notch in said front-rear direction; and said driven end of said latch bolt extends rearward from said main body through said third notch, said first notch and said second notch into said inner compartment.

6. The luggage cart as claimed in claim 2, wherein:

said supporting tray further has two bores extending therethrough in said top-bottom direction;

said top seat further includes two front locating posts extending from said top plate and respectively through said two bores, and two rear locating posts provided to said latch block and located within said inner compartment;

said bottom seat further includes a rear connecting board disposed rearward of said bottom plate and being in abutment against an underside of said latch block, and two threaded posts provided on said bottom plate and being respectively in alignment with said two bores of said supporting tray; and said fastener unit includes two front screws, each threadedly engaging a respective one of said threaded posts and a respective one of said front locating posts, and two rear screws, each threadedly engaging said rear connecting board and a respective one of said rear locating posts.

7. The luggage cart as claimed in claim 2, wherein said top plate of said top seat further has two guide holes extending therethrough in said top-bottom direction and being in communication with said inner compartment, said actuating member further including two guide rods that extend downward from said pressing plate and respectively and movably into said two guide holes.

8. The luggage cart as claimed in claim 7, wherein said actuating member further includes an end plate extending downward from said pressing plate and being in abutment against a rear side of said latch block.

* * * * *